United States Patent
Janarthanan et al.

(10) Patent No.: US 6,503,628 B1
(45) Date of Patent: Jan. 7, 2003

(54) THERMOPLASTIC POLYCARBONATE MOLDING COMPOSITION CONTAINING A RUBBER FREE COPOLYMER AND A COMBINATION OF GRAFT POLYMERS

(75) Inventors: Venkatarayaloo Janarthanan, Gujarat (IN); Roland P. Brassard, Agawam, MA (US); Karl-Erwin Piejko, Longmeadow, MA (US); Sara D. Graham, Amsterdam, NY (US)

(73) Assignee: Bayer Corporation, Pittsburgh, PA (US)

( * ) Notice: Subject to any disclaimer, the term of this patent is extended or adjusted under 35 U.S.C. 154(b) by 0 days.

(21) Appl. No.: 09/538,649

(22) Filed: Mar. 30, 2000

Related U.S. Application Data

(63) Continuation-in-part of application No. 09/098,817, filed on Jun. 17, 1998, now abandoned.

(51) Int. Cl.[7] .................. B32B 27/36; C08K 5/09; C08K 5/10; C08G 63/48
(52) U.S. Cl. ............... 428/412; 524/306; 524/315; 524/318; 525/67
(58) Field of Search ............ 428/412; 525/67; 524/306, 318, 315

(56) References Cited

U.S. PATENT DOCUMENTS

| | | | |
|---|---|---|---|
| 3,130,177 A | | 4/1964 | Grabowski ............ 260/45.5 |
| 3,162,695 A | | 12/1964 | Grabowski ............ 260/873 |
| 3,852,393 A | | 12/1974 | Furukawa et al. ....... 260/873 |
| 4,009,226 A | * | 2/1977 | Ott et al. ............. 260/876 R |
| 4,125,649 A | | 11/1978 | Donovan et al. ........ 427/307 |
| 4,272,584 A | * | 6/1981 | Goldberg et al. ....... 428/412 |
| 4,408,000 A | * | 10/1983 | Lee .................... 524/315 |
| 4,419,492 A | * | 12/1983 | Simon ................. 525/71 |
| 4,438,229 A | * | 3/1984 | Fujmori et al. ........ 524/109 |
| 4,466,912 A | * | 8/1984 | Philips et al. ......... 252/512 |
| 4,472,554 A | * | 9/1984 | Grigo et al. .......... 525/67 |
| 4,560,725 A | * | 12/1985 | Van Bokhoven et al. .. 525/67 |
| 4,764,555 A | * | 8/1988 | Shigemitsu et al. ..... 525/67 |
| 4,826,918 A | * | 5/1989 | Kress et al. .......... 525/67 |
| 4,828,921 A | | 5/1989 | Witman et al. ......... 428/412 |
| 4,847,153 A | * | 7/1989 | Grigo et al. .......... 428/412 |
| 4,880,875 A | * | 11/1989 | Wassmuth et al. ...... 525/67 |
| 4,900,785 A | * | 2/1990 | Leitz et al. .......... 525/67 |
| 5,061,745 A | * | 10/1991 | Wittman et al. ....... 524/139 |
| 5,087,524 A | | 2/1992 | Krishnan et al. ....... 428/412 |
| 5,126,404 A | * | 6/1992 | Thomas et al. ........ 525/67 |
| 5,162,423 A | | 11/1992 | Neumann et al. ....... 524/504 |
| 5,270,387 A | * | 12/1993 | Sheilds et al. ........ 525/71 |
| 5,302,664 A | * | 4/1994 | Eichenauer et al. ..... 525/67 |
| 5,393,835 A | * | 2/1995 | Eckel Thomas et al. .. 525/67 |
| 5,679,759 A | * | 10/1997 | Wittman et al. ....... 528/196 |
| 5,747,586 A | * | 5/1998 | Kohler et al. ........ 525/67 |

FOREIGN PATENT DOCUMENTS

| | | |
|---|---|---|
| EP | 0191942 | 8/1986 |
| EP | 0360112 | 3/1990 |
| GB | 1253226 | 11/1971 |

OTHER PUBLICATIONS

XP–002119370 and JP 08 139449 A (Hitachi Chem. Co.), May 31, 1996.
XP–002119480 and JP 08 269313 A (Nippon GE Plastics), Oct. 15, 1996.

* cited by examiner

*Primary Examiner*—Paul Thibodeau
*Assistant Examiner*—Kevin R Kruer
(74) *Attorney, Agent, or Firm*—Joseph C. Gil; Aron Preis; James R. Franks

(57) ABSTRACT

A thermoplastic molding composition comprising, (A) an aromatic polycarbonate; (B) a single rubber-free copolymer, e.g., of styrene and acrylonitrile; (C) a first graft polymer; (D) a second graft polymer; and (E) a wax, is described. The single rubber-free copolymer (B), and first and second graft polymers (C) and (D) are prepared from a specific selection of graft phases and graft bases. The graft base of the first graft polymer (C) comprises a crosslinked, particulate elastomer having an average particle diameter of 0.05 to 0.5 microns. The second graft polymer (D) has an average particle diameter of 0.6 to 20 microns. The thermoplastic compositions of the present invention are well suited for the preparation of molded articles that may be metalized over at least a portion of their surface by means of an electroless plating process. Such electroless plated articles are characterized as having improved heat resistance and adhesion of the metal plating.

7 Claims, No Drawings

THERMOPLASTIC POLYCARBONATE MOLDING COMPOSITION CONTAINING A RUBBER FREE COPOLYMER AND A COMBINATION OF GRAFT POLYMERS

CROSS REFERENCE TO RELATED PATENT APPLICATION

The present patent application claims the right of priority under 35 U.S.C. §120 and is a Continuation-In-Part of U.S. patent application Ser. No. 09/098,817, filed Jun. 17, 1998 now abandoned.

FIELD OF THE INVENTION

The invention is directed to a thermoplastic molding composition, which contains ABS and polycarbonate and to articles molded therefrom, and more particularly to metal plated articles molded therefrom.

SUMMARY OF INVENTION

A thermoplastic molding composition containing a major amount of polycarbonate and a lesser amount of butadiene based graft polymer is disclosed. The inventive composition is especially suited for the preparation of a molded article wherein at least some of its surface is metallized by an electroless plating process. The thus plated article is characterized in its improved heat resistance and excellent adhesion of its metal plating.

BACKGROUND OF INVENTION

Thermoplastic molding composition containing polycarbonates and ABS polymers have been known for some time, see for example DE-A 1 170 141 which describes the favorable processing properties of such molding compositions. Also relevant are U.S. Pat. Nos. 3,130,177, 3,162,695 and 3,852,393 and British Patent No. 1,253,226.

Also known are thermoplastic molding compositions containing polycarbonate and acrylate based plating modifiers (U.S. Pat. No. 4,828,921) or ABS which are suitable for electroless metal plating. In general, the polycarbonate content in these compositions is kept low as it has long been recognized that the presence of polycarbonate in relatively high amounts is the cause of difficulties in electroless metal-plating (see U.S. Pat. Nos. 5,198,096 and 5,087,524). On the other hand, the heat resistance of the composition is directly related to the polycarbonate level. Blends containing a higher content of polycarbonate feature better thermal performance. The art has long sought a molding composition that would combine good heat resistance with good plating characteristics. The composition of the present invention addresses this goal. Special processes for electroless plating of polycarbonate have been described in U.S. Pat. Nos. 5,087,524 and 5,198,096.

Processes for electroless plating have been disclosed in U.S. Pat. No. 4,125,649 and in the Encyclopedia of Polymer Science and Technology, Vol. 8, both incorporated by reference herein.

DETAILED DESCRIPTION OF THE INVENTION

The thermoplastic molding composition of the invention comprises:

A) 51 to 90 parts by weight of an aromatic polycarbonate;
B) a positive amount up to 30 parts by weight of a rubber free vinyl copolymer of 50 to 99 percent B.1 and 1 to 50 percent B.2, the percents being relative to the weight of the copolymer, where B.1 is at least one member selected from the group consisting of styrene, α-methyl styrene, nucleus-substituted styrene, and methyl methacrylate and where B.2 is at least one member selected from the group consisting of acrylonitrile, methyl methacrylate, maleic anhydride, N-alkyl-substituted maleic imide and N-aryl-substituted maleic imide;
C) 5 to 30 parts by weight of a first graft polymer containing 10 to 90 percent of a first graft phase C.1 and 10 to 90 percent of a first graft base C.2, said percents relative to the weight of said first graft polymer, where said first graft phase C.1 comprise
C.1.1 50 to 99 percent relative to the weight of said first graft phase of at least one member selected from the group consisting of styrene, α-methyl styrene, nucleus-substituted styrene, $C_{1-8}$ alkyl methacrylate and $C_{1-8}$ alkyl acrylate, and
C.1.2 1 to 50 percent relative to the weight of said first graft phase of at least one member selected from the group consisting of acrylonitrile, methacrylonitrile, $C_{1-8}$ alkyl methacrylate, $C_{1-8}$ alkyl acrylate, maleic anhydride, $C_{1-4}$ alkyl substituted maleic imide and phenyl-N-substituted maleic imide,
and where said first graft base comprise a crosslinked, particulate elastomer selected from the group consisting of butadiene and copolymers of butadiene with other ethylenically unsaturated monomers having an average particle diameter (d50 value) of 0.05 to 0.5 microns;
D) 1 to 15 parts by weight of a second graft polymer containing 78 to 95 percent of a second graft phase D.1 and 5 to 22 percent of a second graft base D.2, said percents relative to the weight of said second graft polymer, where said second graft phase D.1 comprise
D.1.1 65 to 85 percent relative to the weight of said second graft phase of at least one member selected from the group consisting of styrene, α-methyl styrene, nucleus-substituted styrene, $C_{1-8}$ alkyl methacrylate and $C_{1-8}$ alkyl acrylate, and
D.1.2 15 to 35 percent relative to the weight of said second graft phase of at least one member selected from the group consisting of acrylonitrile, methacrylonitrile, $C_{1-8}$ alkyl methacrylate, $C_{1-8}$ alkyl acrylate, maleic anhydride, $C_{1-4}$ alkyl substituted maleic imide and phenyl-N-substituted maleic imide,
and where said second graft base comprise a non-crosslinked elastomer selected from the group consisting of polybutadiene and copolymers of butadiene with at least one member selected from the group consisting of styrene, isoprene and $C_{4-8}$ alkyl acrylate having a weight average molecular weight of 50,000 to 250,000 g/mole and where the second graft polymer has a weight average particle diameter of 0.6 to 20 microns; where the sum of A)+B)+C)+D) totals 100 resin, and
E) 0.1 to 4 parts per 100 parts resin of a wax containing at least one ester group having a weight average molecular weight of 300 to 5000 g/Mol and a melting point below 400° C.

In a preferred embodiment, the components of the inventive composition are present in the following amounts:

Component A—55 to 85 parts by weight,
Component B—2 to 20 parts by weight,
Component C—10 to 30 parts by weight,
Component D—2 to 10 parts by weight, and
0.2 to 3 parts of Component E.

In a most preferred embodiment, the components of the inventive composition are present in the following amounts:

Component A—65 to 80 parts by weight,
Component B—2 to 5 parts by weight,
Component C—10 to 25 parts by weight,
Component D—2 to 10 parts by weight, and
0.2 to 3 parts of Component E.

Preferably, the first graft polymer comprise 30 to 80 percent of C.1 and 70 to 20 percent of C.2.

In a yet additionally preferred embodiment, component D contains 94 to 80 percent of a second graft phase D.1, and 6 to 20 percent by weight of a second graft base D.2.

Component A

Suitable polycarbonate resins for preparing the copolymer of the present invention are homopolycarbonates and copolycarbonates and mixtures thereof.

The polycarbonates generally have a weight average molecular weight of 10,000 to 200,000, preferably 20,000 to 80,000, and their melt flow rate, per ASTM D-1238 at 300° C., is about 1 to about 65 g/10 min., preferably about 2 to 15 g/10 min. They may be prepared, for example, by the known diphasic interface process from a carbonic acid derivative such as phosgene and dihydroxy compounds by polycondensation (see German Offenlegungsschriften 2,063,050; 2,063,052; 1,570,703; 2,211,956; 2,211,957 and 2,248,817; French Patent 1,561,518; and the monograph by H. Schnell, "Chemistry and Physics of Polycarbonates", Interscience Publishers, New York, N.Y., 1964, all incorporated herein by reference).

In the present context, dihydroxy compounds suitable for the preparation of the polycarbonates of the invention conform to the structural formulae (1) or (2).

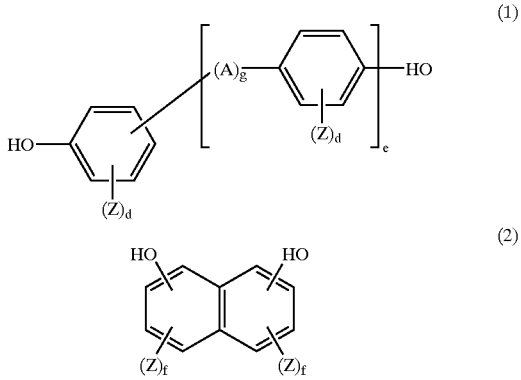

wherein

A denotes an alkylene group with 1 to 8 carbon atoms, an alkylidene group with 2 to 8 carbon atoms, a cycloalkylene group with 5 to 15 carbon atoms, a cycloalkylidene group with 5 to 15 carbon atoms, a carbonyl group, an oxygen atom, a sulfur atom, —SO— or —SO$_2$ or a radical conforming to

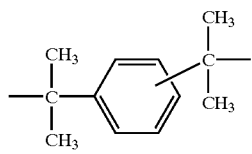

e and g both denote the number 0 to 1;
Z denotes F, Cl, Br or C$_1$–C$_4$ alkyl and if several Z radicals are substituents in one aryl radical, they may be identical or different from one another;
d denotes an integer of from 0 to 4; and
f denotes an integer of from 0 to 3.

Among the dihydroxy compounds useful in the practice of the invention are hydroquinone, resorcinol, bis-(hydroxyphenyl)-alkanes, bis-(hydroxyphenyl)-ethers, bis-(hydroxyphenyl)-ketones, bis-(hydroxyphenyl)-sulfoxides, bis-(hydroxyphenyl)-sulfides, bis-(hydroxyphenyl)-sulfones, α,α-bis-(hydroxyphenyl)-diisopropyl-benzenes, as well as their nuclear-alkylated compounds and dihydroxydiphenyl cycloalkanes. These and further suitable aromatic dihydroxy compounds are described, for example, in U.S. Pat. Nos. 5,227,458; 5,105,004; 5,126,428; 5,109,076; 5,104,723; 5,086,157; 3,028,356; 2,999,835; 3,148,172; 2,991,273; 3,271,367; and 2,999,846, all incorporated herein by reference.

Further examples of suitable bisphenols are 2,2-bis-(4-hydroxy-phenyl)-propane (bisphenol A), 2,4-bis-(4-hydroxyphenyl)-2-methyl-butane, 1,1-bis-(4-hydroxyphenyl)-cyclohexane, α,α'-bis-(4-hydroxy-phenyl)-p-diisopropylbenzene, 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulfide, bis-(3,5-dimethyl-4-hydroxyhenyl)-sulfoxide, bis-(3,5-dimethyl-4-hydroxyphenyl)-sulfone, dihydroxyenzophenone, 2,4-bis-(3,5-dimethyl-4-hydroxyphenyl)-cyclohexane, α,α'-bis-(3,5-dimethyl-4-hydroxyphenyl)-p-diisopropylbenzene and 4,4'-sulfonyl diphenol.

Examples of particularly preferred aromatic bisphenols are 2,2-bis-(4-hydroxyphenyl)-propane, 2,2-bis-(3,5-dimethyl-4-hydroxyphenyl)-propane, 1,1-bis-(4-hydroxyphenyl)-cyclohexane and 1,1-bis-(4-hydroxyphenyl)-3,3,5-trimethylcyclohexane.

The most preferred bisphenol is 2,2-bis-(4-hydroxyphenyl)-propane (bisphenol A).

The polycarbonates of the invention may entail in their structure units derived from one or more of the suitable bisphenols.

Among the resins suitable in the practice of the invention are phenolphthalein-based polycarbonates, copolycarbonates and terpolycarbonates such as are described in U.S. Pat. Nos. 3,036,036 and 4,210,741, both incorporated by reference herein.

The polycarbonates of the invention may also be branched by condensing therein small quantities, e.g., 0.05 to 2.0 mole % (relative to the bisphenols) of polyhydroxy compounds.

Polycarbonates of this type have been described, for example, in German Offenlegungsschriften 1,570,533; 2,116,974 and 2,113,374; British Patents 885,442 and 1,079, 821 and U.S. Pat. No. 3,544,514. The following are some examples of polyhydroxyl compounds which may be used for this purpose: phloroglucinol; 4,6-dimethyl-2,4,6-tri-(4-hydroxy-phenyl)-heptane; 1,3,5-tri-(4-hydroxyphenyl)-benzene; 1,1,1-tri-(4-hydroxy-phenyl)-ethane; tri-(4-hydroxyphenyl)-phenylmethane; 2,2-bis-[4,4-(4,4'-dihydroxydiphenyl)]-cyclohexyl-propane; 2,4-bis-(4-hydroxy-1-isopropy-lidine)-phenol; 2,6-bis-(2'-dihydroxy-5'-methylbenzyl)-4-methyl-phenol; 2,4-dihydroxybenzoic acid; 2-(4-hydroxyphenyl)-2-(2,4-dihydroxy-phenyl)-propane and 1,4-bis-(4,4'-dihydroxytriphenylmethyl)-benzene. Some of the other polyfunctional compounds are 2,4-dihydroxy-benzoic acid, rimesic acid, cyanuric chloride and 3,3-bis-(4-hydroxyphenyl)-2-oxo-2, 3-dihydroindole.

In addition to the polycondensation process mentioned above, other rocesses for the preparation of the polycarbonates of the invention are olycondensation in a homogeneous phase and transesterification. The suitable processes are disclosed in the incorporated herein by reference U.S. Pat. Nos. 3,028,365; 2,999,846; 3,153,008 and 2,991,273.

The preferred process for the preparation of polycarbonates is the interfacial polycondensation process.

Other methods of synthesis in forming the polycarbonates of the invention such as disclosed in U.S. Pat. No. 3,912,688, incorporated herein by reference, may be used.

Suitable polycarbonate resins are available in commerce, for instance, Makrolon FCR, Makrolon 2600, Makrolon 2800 and Makrolon 3100, all of which are bisphenol based homopolycarbonate resins differing in terms of their respective molecular weights and characterized in that their melt flow indices (MFR) per ASTM D-1238 are about 16.5 to 24, 13 to 16, 7.5 to 13.0 and 3.5 to 6.5 g/10 min., respectively. These are products of Bayer Corporation of Pittsburgh, Pennsylvania.

A polycarbonate resin suitable in the practice of the invention is known and its structure and methods of preparation have been disclosed, for example, in U.S. Pat. Nos. 3,030,331; 3,169,121; 3,395,119; 3,729,447; 4,255,556; 4,260,731; 4,369,303; 4,714,746 and 5,227,458, all of which are incorporated by reference herein.

Component B

The rubber-free, thermoplastic vinyl copolymer component B of the present invention, contains B.1) 50 to 99 percent relative to the weight of the copolymer of at least one member selected from the group consisting of styrene, alpha-methyl styrene, nucleus-substituted styrene and methylmeth-acrylate and B.2) 1 to 50 percent relative to the weight of the copolymer of at least one member selected from the group consisting of acrylonitrile, methyl methacrylate, maleic anhydride, N-alkyl-substituted maleic imide and N-aryl-substituted maleic imide.

The weight average molecular weight (as determined by light scattering or sedimentation) of the copolymer of component B is in the range of 15,000 to 200,000.

Particularly preferred ratios by weight of the components making up the copolymer B are 60 to 95 percent of B.1 and 40 to 5 percent of B.2. Particularly preferred copolymers B include those of styrene with acrylonitrile, optionally with methyl methacrylate; copolymers of alpha.-methyl styrene with acrylonitrile, optionally with methyl methacrylate and copolymers of styrene and alpha.-methyl styrene with acrylonitrile, optionally with methyl methacrylate.

The copolymers of component B are known and the methods for their preparation, for instance, by radical polymerization, more particularly by emulsion, suspension, solution and bulk polymerization are also well documented in the literature. The source of B in the claimed composition may be the ungrafted portion of components C and/or D and/or specifically added copolymer.

Component C

The first graft polymer contains 10 to 90 percent of a first graft phase C.1 and 10 to 90 percent of a first graft base C.2, said percents relative to the weight of said first graft polymer. The first graft phase C.1 comprises C.1.1 50 to 99 percent relative to the weight of said first graft phase of at least one member selected form the group consisting of styrene, α-methyl styrene, nucleus-substituted styrene, $C_{1-8}$ alkyl methacrylate and $C_{1-8}$ alkyl acrylate, and C.1.2 1 to 50 percent relative to the weight of said first graft phase of at least one member selected from the group consisting of acrylonitrile, methacrylonitrile, $C_{1-8}$ alkyl methacrylate, $C_{1-8}$ alkyl acrylate, maleic anhydride, $C_{1-4}$ alkyl substituted maleic imide and phenyl-N-substituted maleic imide.

The first graft base comprise a crosslinked, particulate elastomer elected from the group consisting of butadiene and copolymers of butadiene with other ethylenically unsaturated monomers having an average particle diameter (d50 value) of 0.05 to 0.5 microns.

The first graft polymer of the inventive composition is well known in the art and is commercially available. A general description of such graft polymers is included in "Methoden der Organischen Chemie" (Houben Weyl), Vol. 14/1, Georg Thieme Verlag, Stuttgart 1961, pages 393–406 and in C. B. Bucknall, "Toughened Plastics", Appl. Science Publishers, London, 1977, incorporated herein by reference. Suitable graft polymers have been disclosed in U.S. Pat. Nos. 3,564,077; 3,644,574 and 3,919,353, which are incorporated herein by reference.

Particularly preferred first graft polymers C may be obtainable by grafting of at least one (meth)acrylate and/or acrylonitrile and/or styrene as the first grafted phase onto a first graft base containing butadiene polymer having a gel content of at least 50% by weight (as measured in toluene), the degree of grafting (the degree of grafting is the weight ratio of graft monomers grafted on to the graft base and the monomers which were not grafted and is dimensionless) being between 0.15 and 10. In addition to butadiene units, the graft base may contain up to 50% by weight, based on the weight of the butadiene units, of other ethylenically unsaturated monomers, such as styrene, acrylonitrile, esters of acrylic or methacrylic acid containing 1 to 4 carbon atoms in the alcohol component (such as methyl acrylate, ethyl acrylate, methyl methacrylate, ethyl methacrylate), vinyl esters and/or vinyl ethers. The preferred graft base contains only polybutadiene.

Since the graft monomers do not have to be completely grafted onto the graft base in the grafting reaction, the first graft polymer C in the context of the invention is also understood to include products which are obtained by polymerization of the graft monomers in the presence of the graft base.

The average particle sizes (d 50) is the diameter above which 50% by weight of the particles and below which 50% by weight of the particles lie. It may be determined by ultracentrifuge measurement (W. Scholtan, H. Lange, Kolloid Z. und Z. Polymere 250 (1972), 782–796).

The gel content of the graft base may be determined in dimethyl formamide. (M. Hoffmann, H. Kromer, R. Kuhn, Polymeranalytik I und II, Georg Thieme-Verlag, Stuttgart, 1977).

The first graft polymer may be produced by known methods, such as bulk, suspension, emulsion or bulk suspension polymerization, preferably by emulsion polymerization.

The average particle size (d 50) of the first graft polymer component C of the present invention is about 0.05 to 0.5 microns, preferably 0.1 to 0.4 microns.

Component D

Component D, a second graft polymer is present in an amount of 1 to 15 parts by weight.

It contains 78 to 95 percent of a graft phase D.1 and 5 to 22 percent of a graft base D.2, the percents being relative to the weight of the second graft polymer. The graft phase D.1 comprise D.1.1 65 to 85 percent relative to the weight of the graft phase of at least one member selected from the group consisting of styrene, alpha.-methyl styrene, nucleus-substituted styrene, $C_{1-8}$ alkyl methacrylate and $C_{1-8}$ alkyl acrylate, and D.1.2 15 to 35 percent relative to the weight of the graft phase of at least one member selected from the group consisting of acrylonitrile, methacrylonitrile, $C_{1-8}$ alkyl methacrylate, $C_{1-8}$ alkyl acrylate, maleic anhydride, $C_{1-4}$ alkyl substituted maleic imide and phenyl-N-substituted maleic imide.

and where said second graft base comprise a crosslinked elastomer selected from the group consisting of polybutadiene and copolymers of butadiene with at least one member selected from the group consisting of styrene, isoprene and $C_{4-8}$ alkyl acrylate having a weight average molecular weight of 50,000 to 250,000 g/mole and where the second graft polymer has a weight average particle diameter of 0.6 to 20 microns;

In a preferred embodiment, the graft phase contains 80 to 94 percent of D.1.1 and 6 to 20 percent of D.1.2. In a further preferred embodiment, the graft base D.2 is present at an amount of 8 to 18 percent relative to the weight of the second graft polymer.

The second graft polymer of the invention, Component D, is largely similar to component C with a few important differences as these are noted above. This second graft polymer is also well known in the art and is commercially available. This graft has been extensively described in the literature, for instance in, "Methoden der Organischen Chemie" (HoubenWeyl), Vol. 14/1, Georg Thieme Verlag, Stuttgart, 1961, which is incorporated herein by reference.

Particularly preferred second graft polymer D may be obtainable by grafting of at least one (meth)acrylate and/or acrylonitrile and/or styrene as the grafted phase onto a graft base containing butadiene polymer. In addition to butadiene units, the graft base of Component D may contain up to 50% by weight, based on the weight of the butadiene units, of other ethylenically unsaturated monomers, such as styrene, isoprene or $C_{4-8}$ alkyl acrylate. The preferred graft base contains only polybutadiene or poly (butadiene-styrene) copolymer.

Since the graft monomers do not have to be completely grafted onto the graft base in the grafting reaction, the graft polymer D is also understood to include products which are obtained by polymerization of the graft monomers in the presence of the graft base.

The weight average particle size of the second graft polymer, component D, of the present invention is about 0.6 to 20.0 microns, preferably 0.6 to 5 microns, most preferably 0.6 to 1.6 microns.

The second graft polymer may be produced by known methods, such as suspension, bulk or mass graft polymerization. A preferred method entails mass or suspension graft polymerization of the comonomers of the grafted phase, for instance, styrene and acrylonitrile, in the presence of polybutadiene.

In a preferred embodiment, Component D contains 10 to 16% by weight of graft base, which contains only polybutadiene. The weight average molecular weight (GPC) of the free SAN in the styrene/-acrylonitrile graft polymer is in the range from 50,000 to 150,000 and the grafted polybutadiene has a weight average particle size in the range of from 0.6 to 1.6 microns.

Component E

Component E of the inventive composition is a wax which melts below 400° C. Waxes suitable in the practice are well known and are available in commerce. Chemically, these are compounds which are esters of a high molecular weight fatty acid with a high molecular weight alcohol, including mixtures of such esters. The molecular weight, weight average, or, where applicable, formula of the suitable waxes is in the range of 300 to 5000 g/mole. The alcohol component of the ester group is selected from among aliphatic, linear or branched, mono, bi-, or polyfunctional alcohols with more than two carbon atoms, preferably 3 to 22 carbon atoms, the acid component being mono-, di-, or polyfunctional aliphatic acids with more than 3 carbon atoms, preferred more than 5 carbon atoms. These compounds are known and are widely used as additives to polymeric molding compositions for their release function. Preferred compounds are the reaction products of $C_4$ to $C_8$ alcohols and $C_6$ to $C_{18}$ acids. Examples of preferred type esters are butylstearate, butyladipate and dioctyladipate.

Component E is present in the inventive composition in an amount of 0.1 to 4 parts per 100 resin of the total of A, B, C and D.

In addition, the composition of the invention may advantageously contain other additives such as plasticizers, antioxidants, plating additives, silicone oil, stabilizers, flame-retardants, fibers, mineral fibers, mineral fillers, dyes, pigments and the like.

The preparation of the inventive composition follows conventional rocedures which are well known in the art. Usually, however, they are extrusion blended or compounded in a high intensity blender such as a Banbury Mixer or twin-screw extruder.

The invention is now described with reference to the following examples which are for the purposes of illustration only and are not intended to imply any limitation on the scope of the invention.

EXAMPLES

Components Used:

Polycarbonate—A linear polycarbonate based on bisphenol A having a melt viscosity of 4.5 grams per 10 minutes at 300° C. with 1.2 kg load; ASTM D 1238.

ABS-1 and ABS-2—prepared by the graft emulsion polymerization of styrene and acrylonitrile in a weight ratio of S/AN of about 70:30 in the presence of polybutadiene. ABS-1 and ABS-2 contained, respectively, 60 and 38 percent by weight of polybutadiene. The weight average molecular weights of the ungrafted SAN polymer fraction (GPC per ASTM Method D 3536-76) were respectively 80,000 and 100,000 g/mole. The ABS polymer is recovered from the emulsion by conventional coagulation, filtration and washing. The grafted polybutadiene has an average particle size of 0.3 to 0.2 micrometer measured as a d50 value measured by Photon Correlation Spectroscopy using a Brookhaven Instrument Company BI-90 Particle Size.

ABS-3—prepared by the graft suspension polymerization of styrene and acrylonitrile in a weight ratio of 72:28 in the presence of polybutadiene.

ABS-3 contains 14% by weight of polybutadiene. The weight average molecular weight determined by GPC of the free SAN in the styrene/acrylonitrile graft polymer was 110,000 g/mole and the grafted polybutadiene had an average particle size of 0.8 microns SAN-1—a copolymer of styrene and acrylonitrile made by continuous bulk polymerization. The copolymer contains 75.5 weight % styrene and 24.5 weight % acrylonitrile.

Each of the exemplified compositions contained 0.2 parts of butyl stearate per 100 resin of the total of A, B, C and D.

An extrusion process physically blended the components of the polymer blends of each example. This was carried out in a 34 mm Leistritz twin-screw extruder (24:1 L:D screw; 250 revolutions per minute; at 260° C.). A commercial antioxidant having no criticality in the present context was included in the compositional makeup at a level of 0.1% by weight. The die temperature was 260° C. The extruded material is passed through a water bath and pelletized.

The pelletized material is then injection molded into specimens for testing.

Electroless plating was carried out by the process described below:

Specimens tested for peel strength were prepared in the following manner:

| | |
|---|---|
| Chromic Acid/Sulfuric Acid Etching | 10 minutes at 68° C. |
| Dead Rinse | 1 minute |
| Cold Water Rinse | 2 minutes |
| Neutralizer-Shipley PM 954 | 4 minutes at 40° C. |
| Cold Water Rinse | 1 minute |
| Activator-MacDermid D-34 C | 4 minutes at 40° C. |
| Cold Water Rinse | 1 minute |
| Accelerator-Shipley PM 964 | 2 minutes at 52° C. |
| Cold Water Rinse | 1 minute |
| Electroless Copper-Shipley 251 | 10 minutes at 40° C. |
| Cold Water Rinse | |
| Copper Strike | 3 minutes @ 1 volt at 28° C. |
| | 3 minutes @ 2 volts |
| | 2 minutes @ 3 volts |
| Acid Copper | 120 minutes @ 40 amps/square foot at 28° C. |

The plate adhesion was measured in accordance with ASTM method B533-85 and Vicat temperature was measured in accordance with the procedure described in ASTM standard 1525.

The examples shown below illustrate the plate adhesion and heat performance.

In Example 1 (control) (not according to the invention) the heat resistance, determined as Vicat Temperature, is very high, yet the plate adhesion is very poor. In Example 5 (control) (not according to the invention) the adhesion is very good, yet the heat resistance is unacceptably low. Examples 2 and 4 demonstrate the invention where both heat resistance and adhesion are improved.

| | 1 | 2 | 3 | 4 | 5 |
|---|---|---|---|---|---|
| Polycarbonate | 70 | 70 | 70 | 70 | 50 |
| ABS-1 | 14 | | | | |
| ABS-2 | 20 | 20 | 16 | 25 | |
| ABS-3 | 5 | 10 | 10 | 10 | |
| SAN-1 | 16 | 5 | | 4 | 15 |
| Plate Adhesion (lbs/in) | 0.26 | 6.2 | 4.5 | 6.0 | 5.8 |
| Vicat Temperature (° C.) | 140 | 141 | 140 | 141 | 129 |

Although the invention has been described in detail in the foregoing for the purpose of illustration, it is to be understood that such detail is solely for that purpose and that variations can be made therein by those skilled in the art without departing from the spirit and scope of the nvention except as it may be limited by the claims.

What is claimed is:

1. A thermoplastic molding composition comprising:

A) 51 to 90 parts by weight of an aromatic polycarbonate;

B) a positive amount up to 30 parts by weight of a single rubber free copolymer consisting of 50 to 99 percent B.1 and 1 to 50 percent B.2, the percents being relative to the weight of the copolymer, where B.1 is at least one member selected from the group consisting of styrene, nucleus-substituted styrene, and methyl methacrylate and where B.2 is at least one member selected from the group consisting of acrylonitrile, methyl methacrylate, maleic anhydride, N-alkyl-substituted maleic imide and N-aryl-substituted maleic imide;

C) 5 to 30 parts by weight of a first graft polymer containing 10 to 90 percent of a first graft phase C.1 and 10 to 90 percent of a first graft base C.2, said percents relative to the weight of said first graft polymer, where said first graft phase C.1 consists of, C.1.1 50 to 99 percent relative to the weight of said first graft phase of at least one member selected from the group consisting of styrene, nucleus-substituted styrene, $C_{1-8}$ alkyl methacrylate and $C_{1-8}$ alkyl acrylate, and C.1.2 1 to 50 percent relative to the weight of said first graft phase of at least one member selected from the group consisting of acrylonitrile, methacrylonitrile, $C_{1-8}$ alkyl methacrylate, $C_{1-8}$ alkyl acrylate, maleic anhydride, $C_{1-4}$ alkyl substituted maleic imide and phenyl-N-substituted maleic imide, and where said first graft base comprises a crosslinked, particulate elastomer selected from the group consisting of butadiene and copolymers of butadiene with other ethylenically unsaturated monomers having an average particle diameter (d50 value) of 0.05 to 0.5 microns;

D) 1 to 15 parts by weight of a second graft polymer containing 78 to 95 percent of a second graft phase D.1 and 5 to 22 percent of a second graft base D.2, said percents relative to the weight of said second graft polymer, where said second graft phase D.1 consists of, D.1.1 65 to 85 percent relative to the weight of said second graft phase of at least one member selected from the group consisting of styrene, nucleus-substituted styrene, $C_{1-8}$ alkyl methacrylate and $C_{1-8}$ alkyl acrylate, and D.1.2 15 to 35 percent relative to the weight of said second graft phase of at least one member selected from the group consisting of acrylonitrile, methacrylonitrile, $C_{1-8}$ alkyl methacrylate, $C_{1-8}$ alkyl acrylate, maleic anhydride, $C_{1-4}$ alkyl substituted maleic imide and phenyl-N-substituted maleic imide, and where said second graft base comprises a crosslinked elastomer selected from the group consisting of polybutadiene and copolymers of butadiene with at least one member selected from the group consisting of styrene, isoprene and, $C_{4-8}$ alkyl acrylate having a weight average molecular weight of 50,000 to 250,000 g/mole and where the second graft polymer has a weight average particle diameter of 0.6 to 20 microns, where the sum of A)+B)+C)+D) totals 100 parts resin; and E) 0.1 to 4 parts per 100 resin of a wax containing at least one ester group having a weight average molecular weight of 300 to 5000 g/Mol and a melting point below 400° C.

2. The thermoplastic molding composition of claim 1 where Component A is present in an amount of 55 to 85 parts by weight, and Component B is present in an amount of 2 to 20 parts by weight, and Component C is present in an amount of 10 to 30 parts by weight, and Component D is present in an amount of 2 to 10 parts by weight, and component E is present in an amount of 0.2 to 3 parts.

3. The thermoplastic molding composition of claim 1 where the components are present in the following amounts: Component A—65 to 80 parts by weight, Component B—2 to 5 parts by weight, Component C—10 to 25 parts by weight, Component D—2 to 10 parts by weight, and 0.2 to 3 parts of Component E.

4. The thermoplastic molding composition of claim 1 where the average particle size (d 50) of component C is about 0.1 to 0.4 microns.

5. The thermoplastic molding composition of claim 1 where the weight average particle size of component D is 0.6 to 5 microns.

6. The thermoplastic molding composition of claim 1 where the weight average particle size of component D is 0.6 to 1.6 microns.

7. A thermoplastically molded article comprising the composition of claim 1, at least some of its surface is coated with an electrolessly deposited metal.

\* \* \* \* \*